UNITED STATES PATENT OFFICE.

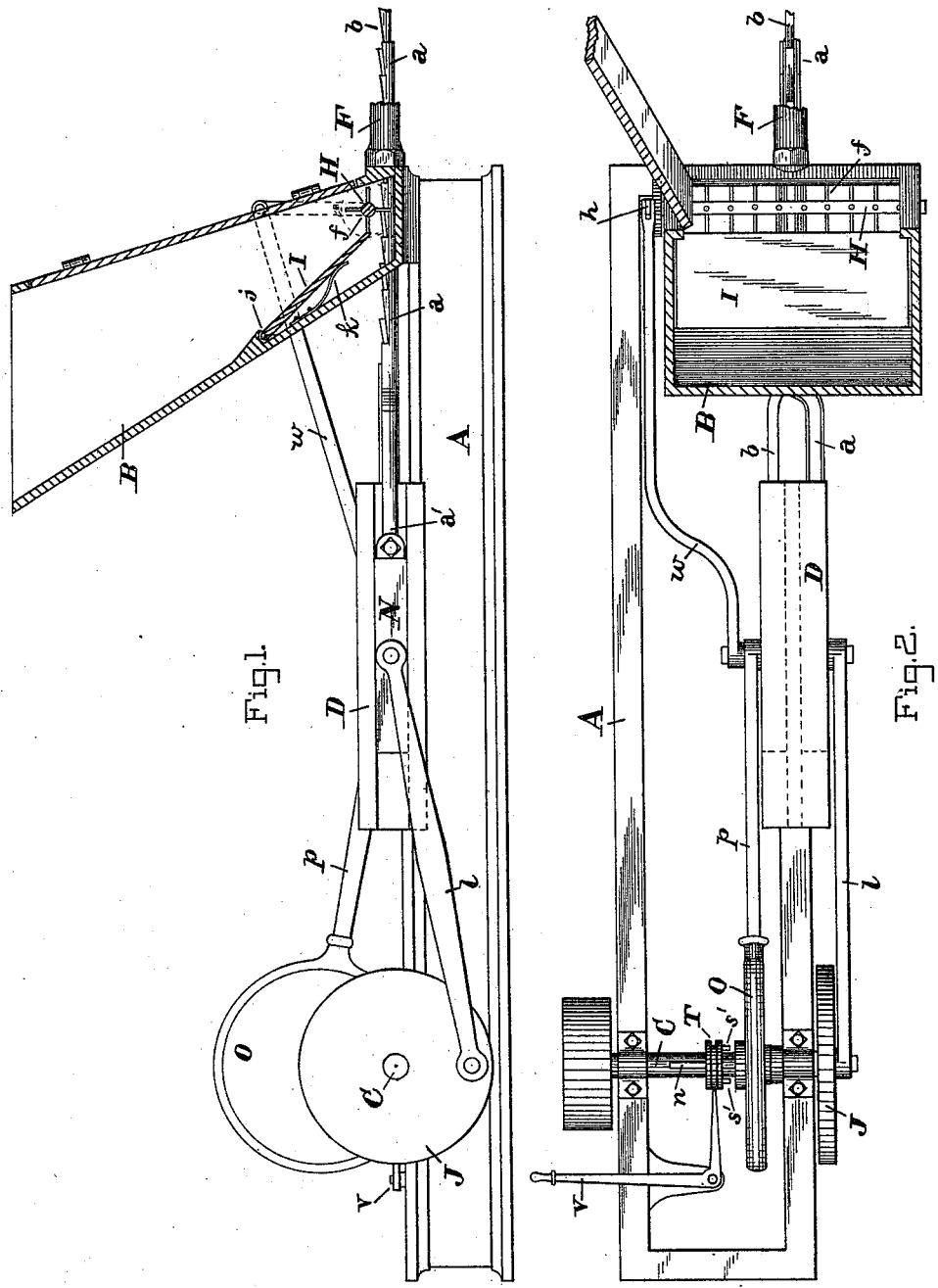

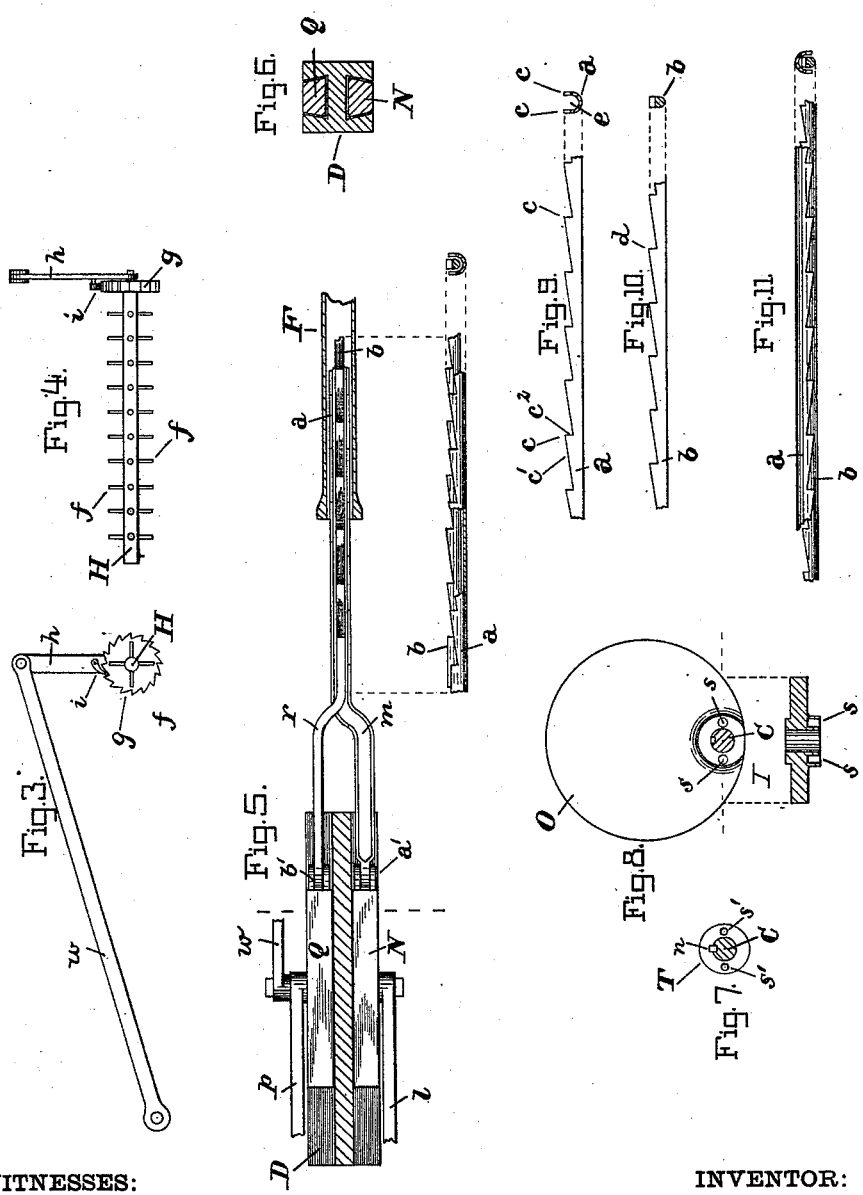

HUGO LEIBE, OF BALTIMORE, MARYLAND.

HARNESS-STUFFING MACHINE.

SPECIFICATION forming part of Letters Patent No. 408,489, dated August 6, 1889.

Application filed May 20, 1889. Serial No. 311,391. (No model.)

*To all whom it may concern:*

Be it known that I, HUGO LEIBE, a citizen of the United States, residing at Baltimore, in the State of Maryland, have invented certain new and useful Improvements in Harness-Stuffing Machines, of which the following is a specification.

This invention relates to a machine for stuffing the padded parts of harness, such as collars, saddles, and crupper-docks. The invention is illustrated in the accompanying drawings, in which—

Figures 1 and 2 show side and top views, respectively, of the machine. In each view the hopper is shown in section. Figs. 3 and 4 are details of the feed mechanism. Figs. 5 and 6 show details of the stuffing devices. Figs. 7 and 8 show details of the clutch device. Figs. 9, 10, and 11 show the two stuffing-rods.

The frame A of the machine in the present instance is horizontal. It supports a hopper B and a drive-shaft C, and a slide D is also fixed to the frame.

For convenience of description the two stuffing-rods $a\ b$ will first be described. The rod $a$ has in cross-section a half-round hollow or concave shape, and thus forms two edges, both of which are provided with teeth $c$. Each of these teeth has a long sloping side $c'$ and an abrupt side $c^2$. The rod $b$ has teeth $d$ of similar shape to those on the rod $a$, and fits in or occupies the concavity $e$ in the other rod. Both of these rods occupy a stuffing-tube F. Each rod has an independent reciprocating movement in the tube, and said reciprocations are alternate—that is, when one rod is moving forward the other is moving backward.

The stuffing-tube F is attached to a hopper B, which receives the material (straw, hair, or seed,) that is to comprise the stuffing. The two stuffing-rods $a\ b$ pass from one side through the lower part of the hopper and at the other side enter the tube F. A suitable feed device consists in the present instance of a revoluble shaft H, provided with prongs or teeth $f$. This shaft extends crosswise through the lower part of the hopper, and at one end, which is outside of the hopper, the shaft has a ratchet-wheel $g$, and an arm $h$ has one of its ends loosely fitted on the shaft and carries a pawl $i$, which engages with the said ratchet-wheel. The oscillation of the arm imparts an intermittent revoluble motion to the feed-shaft H. The side of the hopper opposite that from which the feed-tube F projects has a presser-leaf I, pivoted at its upper end $j$, and therefrom hangs pendent. A spring $k$, between the said pendent leaf and hopper-side, allows the leaf to yield, but keeps it pressed normally toward the feed device H. The prongs of the latter may thereby get a better hold of the stuffing material.

The mechanism for driving the stuffing-rods and feed-shaft consists of the following parts: The drive-shaft C, which has a crank-head J, to which is attached a pitman-rod $l$, that connects with a reciprocating head N on the slide D. The concave stuffing-rod $a$ has a curve $m$ near its end $a'$, and between said end and the hopper and the said end $a'$ is attached to the reciprocating head N. Thus the crank-head J gives motion to one of the stuffing-rods $a$. The drive-shaft also has an eccentric O, which is connected by a rod $p$ with a reciprocating head Q on the slide D. To this head, also, the end $b'$ of the other stuffing-rod $b$ is attached. This rod has a curve $r$ between its end and hopper. As each stuffing-rod near its end is curved, and as the two curves are in a direction to approach each other, the rods are thereby brought into alignment, and, as already stated, one rod $b$ may fit in and occupy the concavity of the other rod $a$.

Provision is made for working both stuffing-rods at once, or one rod only, to suit the work in hand. This consists of a clutch on the drive-shaft, by means of which the eccentric O is engaged or released. The clutch is shown in Figs. 2, 7, and 8. The eccentric is loose on the shaft C, and it has two holes $s$. A slide-collar T is secured on the shaft by a spline $n$, and has two pins $s'$, which may take into the holes $s$ on the eccentric and thereby engage it and cause it to revolve with the shaft. When the collar is moved away from the eccentric so as to withdraw the pin $s'$ from the said holes, then the eccentric is released and it will not revolve, and accordingly one stuffing-rod $b$ will remain stationary although the other continues to reciprocate.

Any suitable means—such as the lever $v$—may be employed to move the clutch-collar T.

The feed-shaft H is moved by a rod $w$, connecting its arm $h$ with the reciprocating head Q on the slide, or with the eccentric-rod $p$, that is attached thereto. By this means the arm $h$ will be oscillated and the feed-shaft H turned. When the eccentric O is released from its engagement with the shaft C, the feed device will cease to work. Thus both stuffing-rods $a\ b$ may work at once to fill the material in and ram it, or the feed device and one rod may be stopped while the other rod merely rams.

These machines may be made of various sizes to suit any part of a harness.

The construction of various parts of the machine may be somewhat varied or changed from that here shown. The frame and hopper may have a different position, and the stuffing-tube and the two rods in it need not have the horizontal position. My invention, therefore, is not limited to this precise construction or arrangement.

Having described my invention, I claim—

1. In a machine for stuffing padded parts of harness, the combination of a hopper, a stuffing-tube leading from the hopper, and two alternately-reciprocating rods, both in the said tube.

2. In a machine for stuffing padded parts of harness, the combination of a hopper, a stuffing-tube leading from the hopper, and two rods in said tube, each provided with teeth and each having a reciprocating movement independent of the other.

3. In a machine for stuffing padded parts of harness, the combination of a hopper, a stuffing-tube leading from the hopper, a drive-shaft having a crank-head and an eccentric, and two independently-movable rods, both in the said stuffing-tube, one of these rods receiving motion from the crank-head and the other from the eccentric.

4. In a machine for stuffing padded parts of harness, the combination of a hopper, a stuffing-tube leading from the hopper, a drive-shaft having a crank-head, an eccentric loose on the drive-shaft and engaged therewith by a clutch device, a slide having two reciprocating heads, rods connecting the crank-head and the eccentric with different reciprocating heads, and two independently-movable rods, both in the said stuffing-tube and each connected to a different reciprocating head.

5. In a machine for stuffing padded parts of harness, the combination of a hopper, a stuffing-tube leading from the hopper, a slide D, two reciprocating heads, each on an opposite side of the slide, and two independently-movable rods, both in the said stuffing-tube, and each rod having near its end a curve and attached to a different one of the said reciprocating heads.

6. In a machine for stuffing padded parts of harness, the combination of a hopper, a stuffing-tube leading from the hopper, a reciprocating rod longitudinally concave, and a second reciprocating rod fitting in the concavity of the first rod, and both of said rods occupying the said stuffing-tube.

In testimony whereof I affix my signature in presence of two witnesses.

HUGO LEIBE.

Witnesses:
JOHN E. MORRIS,
JNO. T. MADDOX.